July 10, 1962

E. KARIG ET AL 3,043,152

HYDRAULIC CONTROL MECHANISM FOR
INFINITELY VARIABLE GEARS

Filed March 14, 1960

Erhardt Karig INVENTORS
Herbert Steuer
Rudolf Schrodt & Otto Dittrich
BY
Bailey, Stephens & Huettig

ATTORNEYS

3,043,152
HYDRAULIC CONTROL MECHANISM FOR INFINITELY VARIABLE GEARS
Erhardt Karig and Herbert Steuer, Bad Homburg vor der Hohe, Rudolf Schrodt, Kronberg, Taunus, and Otto Dittrich, Bad Homburg vor der Hohe, all in Germany, assignors to The Reimers Getriebe K.G., Ascona, Switzerland, a Swiss firm
Filed Mar. 14, 1960, Ser. No. 14,730
11 Claims. (Cl. 74—230.17)

The present invention relates to a hydraulic control mechanism for infinitely variable gears in which the individual gear elements consist of axially displaceable pairs of conical friction disks forming pulleys, which are connected by link chains or similar transmission elements.

It is the principal object of the present invention to provide a control mechanism for an infinitely variable gear of the above-mentioned type which permits the gear ratio to be adjusted arbitrarily to any fixed value independently of the load which might be acting upon the driven side of the gear, and which, whenever desired, may also be set so as to permit the gear ratio to change automatically in accordance with such a load in order to limit the strength of the torque which is then required at the driving side of the gear.

More particularly it is an object of the invention to provide a control mechanism of the above-mentioned type which is especially suitable for infinitely variable gears which are designed to be installed in automobiles and other motor vehicles and are of the type in which the driving and driven gear elements consist of conical pulleys which are connected by link chains or similar transmission elements and in which each pulley consists of a pair of conical disks one of which is axially slidable relative to the other and acted upon by a pressure-applying device to produce the necessary friction between the two conical disks of each pulley and the link chain or similar transmission element to transmit the driving force from one to the other.

The known pressure devices of gears of this type are generally of a mechanical design and adapted to produce the necessary pressure upon the axially slidable conical disks in accordance with the load acting upon the gear and the transmission ratio to which the gear is adjusted at the particular time.

It is another object of the invention to provide a control mechanism for infinitely variable gears of the mentioned type in which the necessary pressure against the slidable pulley disk on the driving shaft of the gear which is required for maintaining and arbitrarily varying the gear ratio, and which is also dependent upon the strength of the load acting on the driven shaft as well as upon the gear ratio, may be produced hydraulically by means of a device which always urges the axially slidable disk of the driving pulley with such a pressure against the link chain or other transmission element that no change in the gear ratio can occur even though the load acting on the driven shaft of the gear might vary. Such a pressure applying device should, however, also be designed so as to permit the gear to be arbitrarily adjusted to any desired gear ratio.

It is a further object of the present invention to provide an infinitely variable gear of the mentioned pulley type which may be adjusted in a very simple manner to any desired gear ratio indipendently of the load which may be acting at any particular time upon the gear, and which in addition allows the actual gear ratio to be controlled in a definite relationship to the load acting upon the driven side of the gear in order to permit the strength of the torque required at the driving side to be arbitrarily limited.

Such a requirement occurs especially in an infinitely variable driving gear of a motor vehicle.

Although in many cases it may be sufficient if the gear ratio can be infinitely varied by the operation of a simple hand lever to adapt the gear to the respective driving conditions, it is often very desirable if the gear could be designed so as to gear down automatically as soon as the load on the driven shaft exceeds a certain limit so that, while the driving torque, i.e. the torque of the drive shaft of the gear produced by the engine, remains substantially the same, the driven shaft will then rotate at a lower speed but have a greater torque available.

The present invention therefore has not only an entirely new object which so far has not even been considered in the art but it also presents a complete solution of this new object. This solution consists in the fact that the pressure of a pressure fluid which acts upon a piston of the pressure-applying device is determined by a control valve the valve member of which is adjustable, on the one hand, in response to the axial displacement of one of the slidable pulley disks so as to produce a control force which opposes any axial displacement of the pulley disks, and which is, on the other hand, arbitrarily adjustable by an actuating member. This solution is further attained by the provision of at least one pressure control valve which is arranged parallel to one of the conduits carrying the pressure fluid and which is adapted to limit the pressure acting upon the slidable pulley disks to any desired value so that, while the gear ratio as set by the actuating member is being maintained, the load to which the gear may be subjected can only reach a certain limit, whereas if this load limit is being exceeded, the gear ratio will be automatically reduced to produce a lower speed of the driven shaft until a state of equilibrium is reached between the pressure required and the pressure actually produced to maintain the new gear ratio.

The pressure control valve is preferably designed in the form of a pressure relief valve which is acted upon by a spring the initial tension of which is adjustable. According to one embodiment of the invention, such an adjustment may be carried out by at least one cam member which acts upon a piston compressing the mentioned spring of the control valve so that, by a manual adjustment of the cam member, the control valve may be set to different positions corresponding to different pressure limits. If the spring tension of the control valve should be adjustable in response to several variable factors, the invention further provides a balance system with a balance beam which is pivotably connected to the rod of the piston acting upon the spring and the free ends of which are acted upon by different cam members which are controlled by the mentioned factors, so that the pressure of the spring of the control valve will then be dependent upon the combined or relative position of all cams. One of these cam members may be adjusted arbitrarily, while a second cam member is automatically adjustable in accordance with the axial displacement of one of the conical pulley disks of the gear, that is, in accordance with a change in the transmission ratio of the gear. The second cam is then preferably connected to the axially slidable pulley disk by a system of levers.

If the arbitrarily adjustable cam member is set so as to produce a very strong initial tension of the spring of the control valve, the respective transmission ratio to which the gear has been set will be maintained regardless of the strength of the load acting thereon. If, however, the tension of the spring is reduced, the preset transmission ratio will be maintained only as long as a certain load on the driven shaft of the gear which corresponds to the particular setting of the control valve is not being exceeded. The pressure of the hydraulic pressure fluid which acts upon the axially slidable pulley disk is limited by the pressure control valve and can therefore not increase to the extent as would be required to maintain the preset gear ratio. The gear ratio will therefore automatically decrease and the speed of the driven shaft will diminish until the pressure upon the slidable pulley disk as limited by the control valve will again be sufficient to maintain the new gear ratio regardless of the increased load acting upon the driven side of the gear. If, on the other hand, the load on the driven shaft of the gear diminishes, the gear ratio will again automatically increase, but only to the limit to which the gear has been originally set. The range of the automatic adjustment of the gear at an increasing load on the driven side thereof is therefore the greatest when the gear has been set to the highest transmission ratio.

The more the spring tension of the pressure control valve is reduced, the smaller may be the load upon the driven shaft at which the gear will be automatically geared down. It is thus possible to restrict the torque which has to be provided at the driving side of the gear, for example, by a prime mover, to any arbitrary limit. This is especially of importance if the prime mover is an internal combustion engine which is controlled to run at a fixed speed and with a fixed amount of fuel. If such an engine is provided with an apparatus according to the invention, any drop in its speed will be prevented and thus also any danger that the engine might stall.

The pressure-applying devices referred to at the beginning which provide the axially directed pressure for transmitting the necessary frictional force between the conical pulley disks and the link chain or other transmitting element in accordance with the load and the gear ratio are also in the present apparatus provided in the form of cam bushings with helically ascending cam surfaces of a changing pitch which are adapted to transmit the torque to the conical pulley disks and to produce at the same time an axially directed pressure of a strength in accordance with the load and the gear ratio. The size of the axially directed pressure which is necessary for maintaining the gear at a certain transmission ratio to which it has once been set also depends upon the design and particular pitch of the helical cam surfaces. By providing the pressure-applying devices of a suitable design, it is therefore possible to insure that, when the gear ratio changes automatically after the gear exceeds a certain torque limit which may be freely selected by the hydraulic control mechanism according to the invention, this ratio will change only to such an extent as is necessary to insure that the size of the input torque required on the drive shaft will remain constant under any load. The size of the input torque may, however, also be made dependent upon any other factors, for example, on the prevailing gear ratio. This may be done in the manner as already indicated, namely, by affecting the spring tension of the pressure control valve by means of a second cam member which, in turn, is adjusted in accordance with the prevailing gear ratio. It is then also possible to maintain the size of the torque required on the driving shaft of a constant value in the event that for some reason the helical cam surfaces of the pressure-applying devices have to be designed of such a changing pitch that the torque required on the driving shaft cannot be made constant without the effect of the second cam which is controlled by the gear ratio.

The control mechanism according to the invention therefore permits, on the one hand, the gear to be set to a certain fixed transmission ratio and, on the other hand, to gear down from such a ratio under a given load by an amount which may be arbitrarily selected. When driving an automobile, it may be desirable, for example, in city traffic, to be able to return very quickly to the preset gear ratio which is independent of the load. According to another feature of the invention which is applicable when using a second cam for adjusting the initial tension of the spring of the pressure control valve, it is for the last-mentioned purpose advisable to provide this second cam on each end of its effective surface with a cam projection of a size to permit the spring of the control valve to be adjusted to a maximum initial tension. This second cam is connected to the lever for the arbitrary adjustment of the gear ratio by a connecting member of limited resilience so that by shifting this lever to either of its end positions for the highest or lowest gear ratios, the gear will be shifted from its elastic stage, that is, from the stage in which it gears down resiliently under a load, and be forced to assume quickly either the highest or lowest gear ratio.

A preferred embodiment of the invention which is very suitable for carrying out the arbitrary adjustment of the gear ratio and also for setting the gear so that its ratio will be dependent upon the load acting upon the driven side consists in the provision of a control stick with two directions of movement at right angles to each other similar to a control stick as known in airplanes. When such a control stick is shifted in one direction, it will effect the arbitrary adjustment of the gear ratio, while when it is shifted in the other direction, it will effect a change in the spring tension of the pressure control valve. With such a control stick it will be possible to select any desired gear ratio which is independent of the load, and also to set the gear so that its ratio will be in a definite relationship to the load and the required input torque may have any desired limit, and it is also possible to shift the control stick very quickly from any particular adjusting position to any other position.

In the above-mentioned embodiments it is advisable to mount the pressure control valve so as to be disposed parallel to the high-pressure line leading from the pressure-fluid pump to the distributing slide valve. It is, however, also possible to provide the pressure control valve so as to be disposed parallel to one of the pressure lines leading from the slide valve to the main pressure-producing piston and to connect a pressure-relief safety valve in parallel to the other pressure conduit leading to the mentioned piston. By such a simple arrangement and a manipulation of the control lever for the arbitrary adjustment of the gear ratio it is possible to shift the gear very quickly to a low ratio.

In place of a pressure control valve, the spring tension of which may be arbitrarily adjusted in accordance with different pressures, it is also possible according to a further embodiment of the invention to provide several pressure control valve which are set to different particular pressures. By means of a suitable switch valve it is then possible to connect at first merely the control valve which is set for the highest pressure to a conduit carrying the pressure fluid, and then successively also the other valves which are set for lower pressures.

These and other objects, features, and advantages of the present invention will become further apparent from the following detailed description, particularly when the same is read with reference to the accompanying diagrammatic drawings of several preferred embodiments of the invention, in which—

Figure 2:
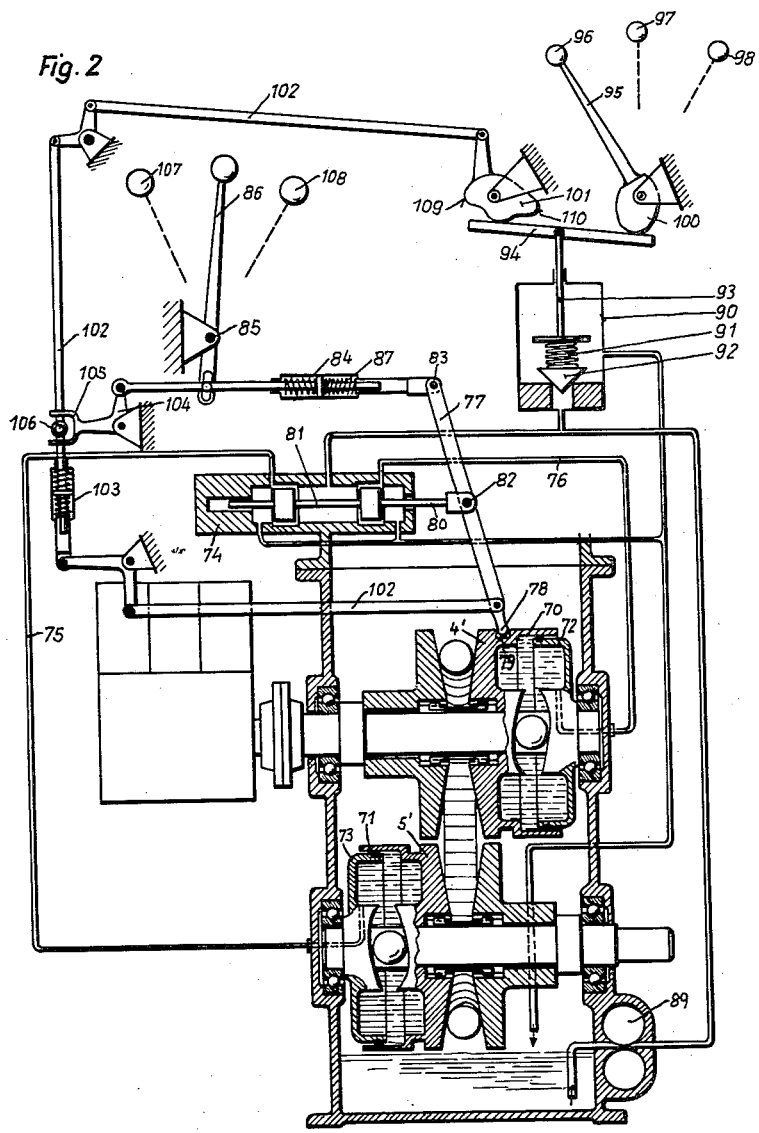
FIGURE 2 shows a diagrammatic longitudinal section of a slightly different gear and a hydraulic control mechanism according to a modification of the invention.
Figure 3:
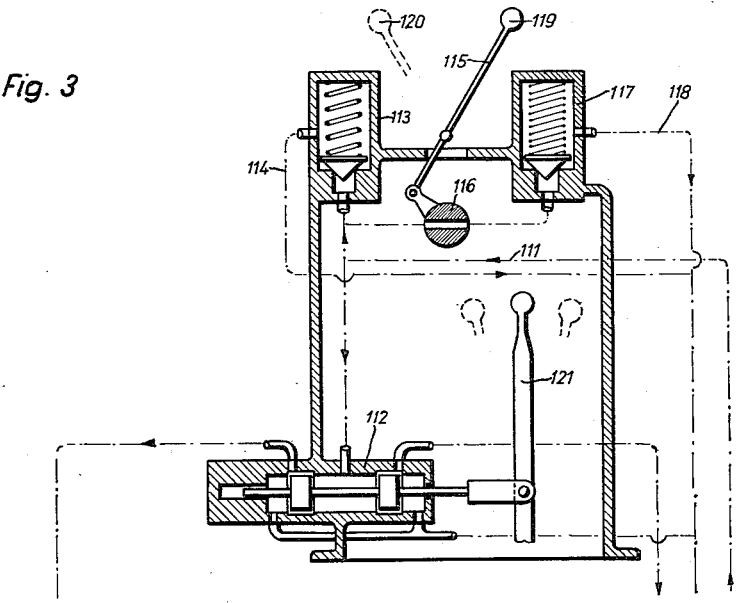
Figure 4:
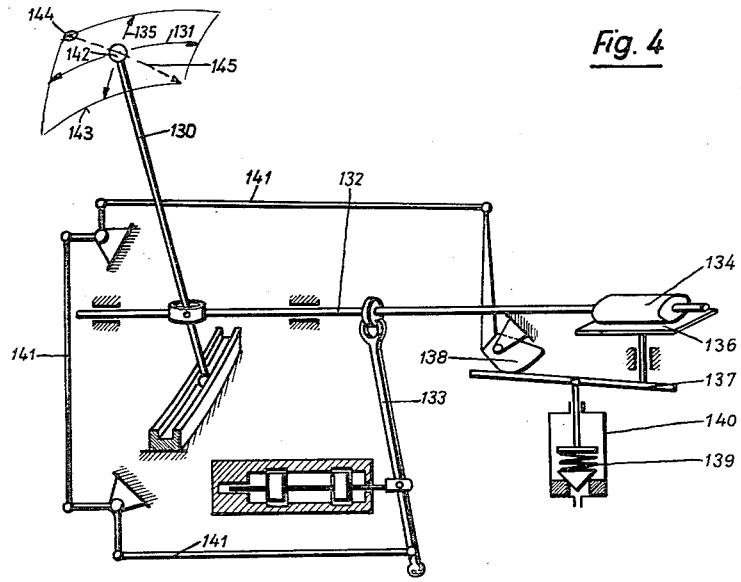

FIGURE 3 shows a longitudinal section of a further modification of the control mechanism which may be connected to an infinitely variable gear of the same construction as that shown in FIGURE 2; while FIGURE 4 shows a diagrammatic illustration, partly in perspective and partly in section, of still another modification of the control mechanism according to the invention which may likewise be connected to an infinitely variable gear of the type as shown in FIGURE 2.

Figure 1:
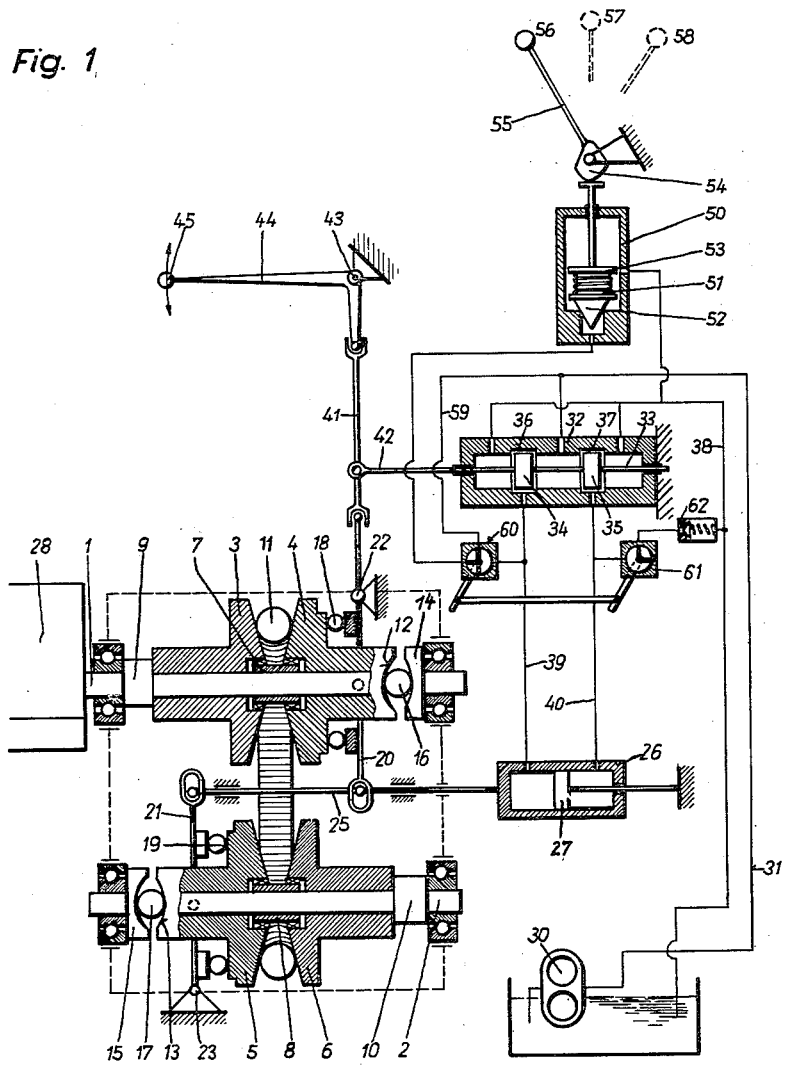
FIGURE 1 shows a diagrammatic longitudinal section of an infinitely variable gear and a hydraulic control mechanism according to the invention.

Referring first particularly to FIGURE 1 of the drawings, the infinitely variable gear has a driving shaft 1 and a driven shaft 2 with a pair of conical disks 3, 4 and 5, 6 rotatably mounted on each shaft. The two disks on each shaft together form a pulley and are connected by a sleeve 8 so as to be nonrotatable relative to each other. Each disk 3 and 6 abuts in the axial direction against a collar 9 or 10 on shaft 1 or 2, respectively, while disks 4 and 5 are axially slidable to permit the radius of travel of the transmission chain 11 between the conical disks of each pair 3, 4 and 5, 6, and thus also the gear ratio, to be changed. The end surfaces of the hubs of disks 4 and 5 are provided with recessed helical cam surfaces 12 and 13 of a changing pitch, and similar helical cam surfaces are provided in the opposite end surface of a bushing 14 and 15 each of which is rigidly connected to shaft 1 and 2, respectively. The associated cam tracks on each shaft are separated by rolling bodies, for example, balls 16 and 17. Through ball bearings 18 and 19, the axially displaceable disks 4 and 5 are in engagement with control levers 20 and 21, respectively, which are pivotable about stationary points 22 and 23 on the gear housing. These two control levers are connected to each other by a control rod 25 which is secured at one end to a cylinder 26 and is slidable together with the latter in the axial direction relative to a stationary piston 27, the cylinder and piston constituting a pressure producing device.

The gear is driven by a prime mover, for example, an internal combustion engine 28, which is connected to drive shaft 1, while the driven element is connected to shaft 2. The torques occurring on the two shafts are transmitted through the pressure-applying means 12, 14, 16 and 13, 15, 17 to each pair of pulley disks 3, 4 and 5, 6, respectively, whereby at the same time an axially directed pressure is produced by the movement of balls 16 and 17 along cam tracks 12 and 13 to press disks 4 and 5 of each pulley against the transmission chain 11 and the latter, in turn, against the axially fixed disks 3 and 6 with a force which is dependent upon the torque on the particular shaft as well as upon the particular axial position of the two disks relative to each other, and thus upon the particular transmission ratio of the gear. By designing the cam tracks 12 and 13 in an appropriate manner, it is possible to make these axially directed forces of a size sufficient to insure a proper frictional transmission of the driving force without, however, producing reactive forces of an unnecessary size.

In such a gear it is, however, still necessary to provide at the driving side thereof a bracing force without which the transmission ratio of the gear would by itself decrease to a lower speed. This bracing force is produced in the particular gear design as shown in FIGURE 1 by a control rod 25 which must always be forced toward the left in order to maintain the particular gear ratio which has once been set. The strength of this bracing force is also dependent upon the load and torque acting upon the gear.

For producing the requiring bracing force, the present invention provides a pump 30 which is adapted to convey a pressure fluid through a conduit 31 into a control cylinder 32. This control cylinder contains a distributing slide valve 33 with a pair of pistons 34 and 35 which are slidable in the longitudinal direction of the cylinder, and it also has annular grooves 36 and 37 of a width only slightly greater than the width of pistons 34 and 35 and disposed centrally to the normal position of the pistons. When slide valve 33 is in the central position as shown in FIGURE 1, the pressure fluid which is injected under a high pressure between the two pistons 34 and 35 may pass through the annular grooves 36 and 37, which are slightly wider than the pistons, and flow back to the container of the pressure fluid through a return conduit 38. Between the two control pistons 34 and 35 a certain pressure will then be built up which is passed through conduits 39 and 40 into cylinder 26 so as to act upon the opposite sides of piston 27.

At the driving side of the gear, control lever 20 is extended beyond its pivot point 22 and connected to another lever 41 to which the piston rod 42 of slide valve 33 is pivotably connected. The free end of lever 41 engages with a hand lever 44 which is pivotable about a fixed pivot 43 and may be shifted by its handle 45 in the direction as shown by the arrows and be arrested by suitable means, not shown, in any desired position.

If the gear—insofar as it has been described—is subjected to a load acting on the driving shaft 2, it will automatically try to change to a lower ratio. The conical disk 4 on the driving side of the gear must then yield toward the right and will thereby shift the lower part of lever 20 toward the right, and thus the upper part of the lever toward the left, so that slide valve 33 will likewise be shifted toward the left since control lever 44 may be regarded as being fixed. Due to this movement of slide valve 33 toward the left, piston 34 will throttle the flow of pressure fluid entering from the high-pressure line 31 during its passage through the annular groove 36 to return line 38, and it will simultaneously increase the size of the passage to pressure line 39. By the same movement, piston 35 will reduce the size of the passage from high-pressure line 31 to pressure line 40 but increase the size of the passage from the pressure line 40 to return line 38. Consequently, the pressure will increase in pressure line 39 and at the left side of piston 27 in cylinder 26, and it will decrease at the right side of piston 27. A bracing force is thus produced which acts in the direction toward the left upon control rod 25 and opposes any further axial displacement of pulley disk 4 toward the right so that the gear ratio can no longer change. Slide valve 33 is designed so as to produce a very strong increase in pressure in pressure line 39 as soon as extremely small axial displacements of pulley disk 4 occur. Since the bracing force which is thus produced acts upon lever 20 and therefore reacts through the latter upon slide valve 33, extremely small axial movements of pulley disk 4 will result in a state of equilibrium in which a bracing force is produced which is in accordance with the load acting at the particular time upon the gear and which is just sufficient to prevent a change in the gear ratio.

If hand lever 44 is shifted, slide valve 33 will thereby also be shifted in one or the other direction with the result that in front of or behind piston 27 a higher pressure will be produced the force of which will change the gear ratio until, by the reaction through control lever 20, slide valve 33 has again moved approximately to its central position and has produced a bracing force which is just sufficient to maintain the new gear ratio. After once being set, the gear ratio will remain practically unaffected by any changes in the load acting upon the gear.

This apparatus as above described for hydraulically producing the bracing force which is necessary for maintaining or arbitrarily changing the gear ratio is further combined with an apparatus by means of which it is possible to reduce the pressure which acts upon the main piston 27 to any desired value. For this purpose, the invention provides a pressure control valve 50 which contains a valve cone 52 which is acted upon by a spring 51. The other end of spring 51 is supported on a piston 53 which is adjustable in its axial direction by means of a cam plate 54 in order to vary the initial tension of the spring. Cam plate 54 may be pivoted by a handle 55 to different positions, as indicated, for example, by the three positions 56, 57 and 58.

This pressure control valve 50 is supplied with the pressure furnished by pump 30 through pressure line 31 and its extension 59 and a switch valve 60. If handle 55 is in the position 56, as shown in FIGURE 1, spring 51 of control valve 50 will be given its maximum initial tension. In this event, not even the pressure which is being built up in control cylinder 32 when the gear is under a maximum load will be sufficient to lift valve cone 52 off its seat, and the gear will therefore operate as previously described. If handle 55 is, however, shifted to position 57, the spring tension of control valve 52 will be reduced and valve cone 52 will remain closed until a bracing pressure has been built up in control cylinder 32 and thus also in the main cylinder 26 which corresponds to a certain load acting upon the driven shaft 2. Until this load is reached, the gear will continue to operate as previously described and the gear ratio will remain constant. If, however, this certain load is exceeded, it would require a higher bracing pressure to maintain the preset gear ratio. As soon as this occurs, valve cone 52 will be lifted so that no higher bracing pressure can be built up. The gear will therefore automatically change to a lower ratio until at a lower speed of the driven shaft the state of equilibrium is again attained between the bracing pressure as determined by the adjustment of the pressure control valve and the bracing pressure as required at the new gear ratio under the higher load. The size of the load on the driven shaft at which the gear will start to change automatically to a lower ratio may be determined by adjusting the spring of the control valve to the appropriate tension. Thus, the relatively high spring tension attained in the position 57 of handle 55 corresponds to a relatively high load, while the position 58 with a lower spring tension corresponds to a lower load.

If the load drops below the limit at which the automatic change in the gear ratio started, the gear will return to its initial ratio without, however, being able to exceed the ratio as set by handle 44.

In the event that the driving or input power acting on shaft 1 remains constant, it is possible by means of the pressure control valve to produce an operation such that, when the load limit on the driven shaft is being exceeded, this input power will be available in the form of a lower speed and a greater torque. Assuming that the driving engine 28 runs at a constant speed, it will in this manner be possible to make the torque required on the driving shaft constant or to limit it to a predetermined value even though the load changes on the driven shaft.

A change in the gear ratio by an amount which is just sufficient to maintain the driving torque constant at a constant driving speed may be attained by an appropriate design of the cam tracks of the pressure-applying devices 12, 14, 16 and 13, 15, 17. By a different design of the cam tracks it is, however, also possible to attain any other desired variations of the driving torque upon the occurrence of changes in the load on the driven shaft.

If the resilience of the gear when exceeding a certain load limit, as described above, is to be eliminated and the gear is to be adjusted to a different ratio independent of the load, as becomes occasionally necessary in an automobile in city traffic, it will only be necessary to shift the handle 55 to the position 56, whereupon hand lever 44 may be shifted to set the gear to any desired gear ratio independent of the load.

The disadvantage that it would be necessary in such a case to operate two levers may be easily avoided. For this purpose, the limitation of the bracing pressure by the pressure control valve 50 is not carried out in the manner as previously described, that is, within the high-pressure line between pump 30 and control cylinder 32, but in pressure line 39 between control cylinder 32 and the main cylinder 26, which line normally carries the higher pressure. It is for this reason that switch valve 60 is provided which, when its valve plug is turned counterclockwise about an angle of 90°, connects the pressure control valve 50 to the pressure line 39. Switch valve 60 is mechanically coupled to another switch valve 61 which, when its valve plug is turned in the same direction and through the same angle as the valve plug of valve 60, connects the pressure line 40 to a safety pressure relief valve 62. This valve arrangement permits the gear to be changed very quickly to a lower range even though handle 55 is in one of the positions 57 or 58. This is due to the fact that, if hand lever 44 is turned downwardly from the position as shown in FIGURE 1, the distributing slide valve 33 will be shifted toward the right. The flow of pressure fluid coming from the pump will then be blocked by piston 34 from passing to pressure line 39, whereas piston 35 will open the fluid passage to pressure line 39 completely. At the same time, the pressure in line 39 will be released since it is connected through the annular groove 36 to the return line 38. The pressure at the left side of the main piston 27 therefore drops to zero, while the pressure at the right side of piston 27 increases to the maximum value which is determined by the pressure relief valve 62. Control rod 25 is thereby drawn with a great force toward the right so that the gear will be quickly changed to a low speed. The effect of the pressure control valve 50 is thus eliminated so that only a single hand lever has to be operated. A quick adjustment to a high speed is, however, not possible with this arrangement, and usually it is also not required.

FIGURE 2 illustrates another embodiment of the invention in which the infinitely variable gear is of a construction which is in principle similar to the gear according to FIGURE 1 and differs therefrom merely by the fact that the axially displaceable conical pulley disks 4' and 5' are also adapted to take over the function of the main pressure piston 27 of FIGURE 1. Pulley disks 4' and 5' are for this purpose each provided with a cylindrical flange 70 or 71, while the cam bushings form fixed pistons 72 and 73 which project into cylinders 70 and 71, respectively. Into these closed cylinders the pressure fluid is passed from control cylinder 74 through pressure lines 75 and 76, respectively, and through bores in the gear shafts. This gear is only provided with a single control lever 77, one end 78 of which engages into an annular groove 79 in the axially movable pulley disk 4'. At the center, control lever 77 is pivotally connected at 82 to piston rod 80 of slide valve 81, while its other end 83 is pivotably connected to a connecting rod 84 which, in turn, is connected to a setting lever 86 for setting the gear ratio which is pivotable about a fixed pivot 85. Connecting rod 84 is provided with a spring member 87 by means of which rod 84 may, at the occurrence of considerable forces, be either shortened or lengthened. The operation of this gear is very similar to that of the gear according to FIGURE 1, except for the fact that the bracing forces are not produced in a movable cylinder (26) with a stationary piston (27) and are not transmitted to the axially movable pulley disks by means of a system of levers, but that they are produced directly in the cylinder chambers which revolve together with the axially movable pulley disks. Thus, the bracing pressure which is required under the given load on the driven shaft for maintaining the gear ratio which is set by hand lever 86 is also produced on the driving side within the cylinder chamber. Also in this embodiment, a pressure control valve 90 which is provided with a spring 91, a valve cone 92, and an adjustable valve piston 93 is connected in parallel to the high-pressure line leading from pump 89 to control cylinder 74. The end of the piston rod of piston 93 carries a balance beam 94 which is pivotably mounted thereon and one end of which is acted upon by a cam plate 100 which is adjustable by a hand lever 95, while the other end is acted upon by a second cam plate 101 which is connected through a system of levers 102 to the end 78 of control lever 77 so that an axial displacement of pulley disk 4' will result in a pivotal movement of cam plate 101. Levers 102 contain a spring member 103 which permits the length of one of the levers to be extended but normally maintains this length constant. Hand lever 95 may be set, for example, to the positions 96, 97, and 98. In position 96, spring 91 will be tightened to such an extent that the gear will maintain the preset gear ratio under any load. In positions 97 and 98, the gear ratio is automatically lowered when a load limit as determined by the position of lever 95 is being exceeded, as described in detail with reference to FIGURE 1. However, the axial displacement of pulley disk 4' which then occurs at the adjustment of the gear ratio is in this case utilized by means of levers 102 and cam plate 101 to change the spring tension during the gear ratio adjustment in accordance with the particular shape of this cam. This makes it possible to insure, for example, a constant input torque at a changing load even though for some reason the design of the cam tracks of the pressure-applying devices might not permit the input torque to be kept constant without the aid of this second cam plate 101. On the other hand, this adjustment of the spring tension in accordance with the gear ratio permits any desired amount of gearing down when the load increases.

Connecting rod 84 is extended beyond its pivot point on hand lever 86 and the end of this extension is connected to one arm 104 of a bell crank, the other arm 105 of which is bifurcated and disposed at both sides of, but spaced from an abutment 106 on connecting rod 102 so that any normal adjustment of hand lever 86 will not affect the levers 102 and through them the cam plate 101. If, however, hand lever 86 is deliberately forced beyond its normal end positions, for example, the positions 107 and 108 in FIGURE 2, one of the inner surfaces of fork 105 will engage with abutment 106 and shift levers 102 to turn cam plate 101 to such an extent that the cam projections 109 and 110 at the ends of the normal cam surface will tighten spring 91 to its maximum tension, whereby the gear will be rapidly and foreably shifted to its highest or lowest ratio. Since in this event the connecting levers 102 and also the connecting rod 84 must be able to yield resiliently, the above-mentioned spring members 87 and 103 are provided.

FIGURE 3 illustrates diagrammatically a further modification of the hydraulic control mechanism according to the invention, in which, however, the infinitely variable gear is not shown since it may be of the same type of construction as that described with reference to FIGURE 2. In this embodiment, the pressure control valve 99 according to FIGURE 2 with an adjustable spring tension is replaced by two control valves each of which has a fixed initial spring tension. The pressure fluid passes from the pump via the high-pressure line 111, on the one hand, to control cylinder 112 and, on the other hand, to a pressure control valve 113 which will open only under a very high pressure. Line 114 is the return line. The pressure fluid may, however, also flow through a stop valve 116 which may be shut off by a lever 115, to a second pressure control valve 117 which is set so as to open under a lower pressure. After this valve has opened, the pressure fluid can pass through line 118 to the return line.

Obviously, instead of only two pressure control valves as shown in FIGURE 3, it is also possible to provide a still greater number of such valves parallel to each other and each with a lower preset spring tension. When the hand lever 115 is in the position 119 as illustrated, the pressure control valve 117 which has a lower spring tensoin will open as soon as a certain load is being exceeded. If hand lever 115 is, however, shifted to the position 120, the flow of pressure fluid to the lower-pressure valve 117 will be shut off so that the pressure fluid can only act upon the pressure control valve 113 which has a higher spring tension. In this event, the bracing pressure produced by the pump will be sufficient to keep the gear ratio at any load occurring in the normal operation at the value as set by hand lever 121.

FIGURE 4 shows diagrammatically still another modification of the control elements for the hydraulic control mechanism according to the invention. Also in this case, the infinitely variable gear is not illustrated as it may be similar to that as shown in FIGURE 2. The manual control element consists in this embodiment of a control stick 130 with a knob 142 which is movable in two directions at an angle to each other. When this control stick is moved back or forth within one direction as indicated by the double arrow 131, it will shift a control rod 132 along its axial direction and thereby act only upon a lever 133 to adjust the gear ratio. Control rod 132 carries a cam member 134 which, when control stick 130 is being moved in the direction of the double arrow 131, is merely shifted in the axial direction without causing any other results.

Control stick 130 may, however, also be moved at the same time in the other direction, that is, the direction as shown by the double arrow 135, which causes a rotary movement of control rod 132 but does not affect the position of setting lever 133. By this rotary movement, cam member 134 will be turned about its axis and thereby act upon a plate 136 which, in turn, will depress one end of a balance beam 137, the other end of which rests against a cam plate 138. Thus, by the rotation of cam member 134, spring 139 of the pressure control valve 140 may be given different degrees of initial tension.

Any axial displacement of pulley disk 4' as shown in FIGURE 2 will also in this case be transmitted to cam plate 138 through a control rod 141 which corresponds to rod 102 as shown in FIGURE 2, and this cam plate 138 will be turned in accordance with the amount of the axial displacement of the pulley disk so that the spring tension of the pressure control valve will be changed in accordance with a change in the gear ratio.

If the control stick is shifted to any point along the line 143, the pressure control valve 140 will be set to its maximum tension and the gear may be adjusted to any desired gear ratio which it will maintain independently of the load. A movement of the control stick from any point along line 143 in a direction vertically to that line will turn cam member 134 so as to reduce the spring tension of the pressure control valve 140. If the gear is then set to a particular gear ratio and a certain load limit on the driven shaft might then be exceeded, the gear ratio will then automatically change to a lower speed. The farther knob 142 on control stick 130 is then shifted away from line 143, the smaller will be the load limit at which this automatic change of the gear ratio will occur in accordance with the prevailing load. If the gear has, for example, been set almost to the highest gear ratio and the load at which the automatic adjustment is supposed to start is very low, the knob of the control stick will be located at the point 144 and may be easily and gradually shifted from that point, for example, in the direction of the arrow 145 shown in dotted lines, whereby the resilience of the gear, that is, its ability to gear down when the load increases, will be eliminated and the gear ratio will at the same time be adjusted to the slowest speed of the driven shaft independently of the load acting thereon. As already mentioned previously, such an adjustability is especially desirable if the infinitely variable gear and the hydraulic control mechanism according to the invention is installed in an automobile or other vehicle.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In an infinitely variable gear mechanism having parallel driving and driven shafts, a pair of conical disks together forming a pulley on each of said shafts, a transmission member connecting said pulleys, at least one disk of each pair being slidable along and rotatable with the shaft, means operatively connected to the slidable disk on the driven shaft to move said disk toward the other disk on the driven shaft and against the transmission member thereon in response to the load acting upon the driven shaft and in response to the prevailing gear ratio, a hydraulic pressure producing device operatively connected to the slidable disk on the driving shaft for exerting thereon the pressure necessary for maintaining and arbitrarily varying the gear ratio; said pressure producing device comprising a cylinder part and a piston part in the cylinder part, one of said parts being slidable with respect to the other, a source of pressure fluid, a control valve, connections from the source of fluid to the control valve and from the control valve to the cylinder on opposite sides of the piston, means operatively connecting the control valve to one of the slidable pulley disks to move the control valve in response to movements of said disks so as to produce a force on the disks opposing displacement thereof, an actuating member for arbitrarily adjusting said valve member, at least one pressure control valve connected in parallel to said connections for limiting the pressure acting upon the slidable pulley disks to any desired value so that, while the gear ratio as set by said actuating member is maintained, the load to which the gear may be adjusted can only reach a certain limit, whereas, if this load limit is exceeded, the gear ratio will be automatically reduced to produce a lower speed of the driven shaft until a state of equilibrium is reached between the pressure required and the pressure actually produced to maintain the new gear ratio.

2. A gear mechanism as defined in claim 1, in which said pressure control valve comprises a pressure relief valve having a valve member therein and a spring operatively engaging said valve member, and control means for varying the initial tension of said spring.

3. A gear mechanism as defined in claim 2, in which said spring control means comprise a piston operatively engaging the end of said spring opposite to the end engaging said valve member, and at least one cam member operatively engaging said piston to vary said spring tension.

4. A gear mechanism as defined in claim 2 in which said spring control means comprise a piston operatively engaging the end of said spring opposite to the end acting upon said valve member, said piston having a piston rod, a balance beam pivotably mounted on the free end of said piston rod, a plurality of cam members operatively engaging the opposite sides of said balance beam to vary said spring tension, and means for adjusting said cam members so that the tension of said spring is dependent upon the particular adjustment of all of said cam members.

5. A gear mechanism as defined in claim 4, in which said adjusting means of one of said cam members are arbitrarily adjustable, the adjusting means of a second cam member including means operatively connected to one of said pulley disks for adjusting said second cam member in response to axial displacement thereof and thus in response to a change in the gear ratio.

6. A gear mechanism as defined in claim 5, in which said adjusting means of said second cam member include a plurality of levers connecting one of said slidable pulley disks to said second cam member so that the axial displacement of said pulley disk will be transmitted to said second cam member.

7. A gear mechanism as defined in claim 6, in which said second cam member has a projection on each end thereof for tightening said spring to a maximum tension.

8. A gear mechanism as defined in claim 2, further including a control stick, means mounting said control stick so as to be movable in two directions at an angle to each other, means connecting said control stick to said actuating member to permit said member and thus the gear ratio to be arbitrarily adjusted when said control stick is moved in one direction, and means connecting said control stick to said spring control means to permit the tension of said spring of said pressure relief valve to be adjusted when said control stick is moved in the other direction.

9. A gear mechanism as defined in claim 2, in which said pressure control valve is disposed parallel to a part of said connections between said source and said first control valve.

10. A gear mechanism as defined in claim 2, in which said connections include a pair of lines connecting said first control valve to said cylinder at opposite sides of said piston therein, said second pressure control valve being disposed in parallel with one of said lines, a safety pressure relief valve, and means connecting said last valve in parallel to the other line.

11. In a gear mechanism as defined in claim 1, in which at least two pressure control valves are provided, each of said valves having a valve member and a spring acting upon said valve member, said springs having different initial tensions so as to open said valves at different pressures, and a switch valve for connecting at first only the valve which is set for the highest pressure and thereafter successively also the other valve which is set for lower pressure in parallel to said connections.

References Cited in the file of this patent

UNITED STATES PATENTS

| 2,731,849 | Rockwood et al. | Jan. 24, 1956 |
| 2,754,691 | May | July 17, 1956 |
| 2,779,203 | Eubanks | Jan. 29, 1957 |

FOREIGN PATENTS

| 1,146,756 | France | Nov. 14, 1957 |